(12) United States Patent
Deng et al.

(10) Patent No.: US 12,068,778 B2
(45) Date of Patent: Aug. 20, 2024

(54) ON-CHIP WAVEFRONT SENSOR, OPTICAL CHIP, AND COMMUNICATION DEVICE

(71) Applicant: PENG CHENG LABORATORY, Shenzhen (CN)

(72) Inventors: Shupeng Deng, Shenzhen (CN); Caiming Sun, Shenzhen (CN); Weiwei Liu, Shenzhen (CN); Aidong Zhang, Shenzhen (CN)

(73) Assignee: PENG CHENG LABORATORY, Shenzhen (CN)

( * ) Notice: Subject to any disclaimer, the term of this patent is extended or adjusted under 35 U.S.C. 154(b) by 0 days.

(21) Appl. No.: 18/278,250

(22) PCT Filed: Jun. 28, 2021

(86) PCT No.: PCT/CN2021/102734
§ 371 (c)(1),
(2) Date: Aug. 22, 2023

(87) PCT Pub. No.: WO2022/179019
PCT Pub. Date: Sep. 1, 2022

(65) Prior Publication Data
US 2024/0039628 A1 Feb. 1, 2024

(30) Foreign Application Priority Data
Feb. 23, 2021 (CN) .......................... 202110202688.1

(51) Int. Cl.
*H04B 10/079* (2013.01)
*G01J 9/00* (2006.01)

(52) U.S. Cl.
CPC .... *H04B 10/0795* (2013.01); *G01J 2009/002* (2013.01)

(58) Field of Classification Search
CPC .................. H04B 10/0795; G01J 2009/002
USPC ............................................................. 398/9
See application file for complete search history.

(56) References Cited

U.S. PATENT DOCUMENTS

| 10,693,561 | B2 * | 6/2020 | Lim .................. H04J 14/06 |
| 2020/0204263 | A1 | 6/2020 | Zhou et al. | |

FOREIGN PATENT DOCUMENTS

| CN | 104467981 | A | | 3/2015 | |
| CN | 106680831 | A | | 5/2017 | |
| CN | 108667516 | A | | 10/2018 | |
| CN | 109991582 | A | | 7/2019 | |
| CN | 110631716 | A | | 12/2019 | |
| CN | 110687518 | A | * | 1/2020 | ............. G01S 17/89 |
| CN | 110687518 | A | | 1/2020 | |
| CN | 112051582 | A | | 12/2020 | |

(Continued)

*Primary Examiner* — Mohammad R Sedighian
(74) *Attorney, Agent, or Firm* — The Webb Law Firm

(57) ABSTRACT

An on-chip wavefront sensor, an optical chip, and a communication device are disclosed. The on-chip wavefront sensor includes an antenna array configured for separating received spatial light to obtain a plurality of sub-light spots; a reference light source module configured for generating a plurality of intrinsic light beams; a phase shifter array configured for performing phase shifting processing on the intrinsic light beams to obtain reference light; and an optical detection module configured for performing coherent balanced detection according to the reference light and the sub-light spots to obtain a photocurrent corresponding to each of the sub-light spots.

5 Claims, 5 Drawing Sheets

AA     Antenna array
ILS     Intrinsic light source

(56) References Cited

FOREIGN PATENT DOCUMENTS

| CN | 112068147 | A | | 12/2020 | |
|----|-----------|---|---|---------|---|
| CN | 112304443 | A | | 2/2021 | |
| CN | 113162696 | B | * | 6/2022 | ............. H04B 10/61 |
| CN | 113162685 | B | | 8/2022 | |

* cited by examiner

AA    Antenna array
ILS   Intrinsic light source

AA    Antenna array
ILS   Intrinsic light source

AA   Antenna array
ILS  Intrinsic light source

AA   Antenna array

ILS  Intrinsic light source

ON-CHIP WAVEFRONT SENSOR, OPTICAL CHIP, AND COMMUNICATION DEVICE

CROSS-REFERENCE TO RELATED APPLICATION

This application is the United States national phase of International Application No. PCT/CN2021/102734, filed Jun. 28, 2021, and claims priority to Chinese Patent Application No. 202110202688.1, filed Feb. 23, 2021, the disclosures of which are hereby incorporated by reference in their entireties.

BACKGROUND

1. Technical Field

The present disclosure relates to the technical field of optical communication, and in particular to an on-chip wavefront sensor, an optical chip, and a communication device.

2. Technical Considerations

Spatial light communication systems use water/atmosphere as the transmission medium. As the turbulence effect causes fluctuations in the refractive index of the transmission medium, the amplitude and phase of light change randomly, affecting the quality of spatial beams. Especially, the wavefront phase mismatch caused by turbulence has serious impact on the performance of coherent optical communication. Therefore, an adaptive correction technology needs to be introduced in spatial light communication systems to overcome the impact of turbulence on signal light.

Wavefront sensor is an important component in adaptive optical systems. Currently, Shack-Hartmann wavefront sensors are used. A Shack-Hartmann wavefront sensor includes a microlens array and a charge coupled device (CCD) camera. After an incident wavefront enters the microlens array, a light spot distribution is formed on the CCD camera. Then the intensity and position of each light spot detected by the CCD camera are analyzed, so as to dynamically measure the incident wavefront and characterize the wavefront distortion. Spatial light communication systems, especially underwater spatial light communication systems, require miniaturization and high integration. However, existing Shack-Hartmann wavefront sensors are large in size, require high assembly precision, and cannot be integrated in optical chips.

SUMMARY

A main objective of the present disclosure is to provide an on-chip wavefront sensor, an optical chip, and a communication device, to solve the technical problems of high assembly precision requirement and low integration of wavefront sensors in existing technologies.

To achieve the above objective, the present disclosure provides an on-chip wavefront sensor. The sensor includes: an antenna array, a reference light source module, a phase shifter array, and an optical detection module, where an output end of the antenna array is connected to an input end of the optical detection module, an output end of the reference light source module is connected to an input end of the phase shifter array, and an output end of the phase shifter array is connected to another input end of the optical detection module;

the antenna array is configured for separating received spatial light to obtain a plurality of sub-light spots and outputting the sub-light spots to the optical detection module;

the reference light source module is configured for generating a plurality of intrinsic light beams and outputting the intrinsic light beams to the phase shifter array;

the phase shifter array is configured for performing phase shifting processing on the intrinsic light beams to obtain reference light and outputting the reference light to the optical detection module; and the optical detection module is configured for performing coherent balanced detection according to the reference light and the sub-light spots to obtain a photocurrent corresponding to each of the sub-light spots.

In an embodiment, the reference light source module includes a 1-to-N beam splitter and an intrinsic light source. An output end of the intrinsic light source is connected to an input end of the 1-to-N beam splitter, and an output end of the 1-to-N beam splitter is connected to the input end of the phase shifter array; the 1-to-N beam splitter is formed by a plurality of cascaded sub-beam splitters, the phase shifter array includes a plurality of phase shifters, and the output end of the 1-to-N beam splitter is connected to an input end of each of the phase shifters;

the intrinsic light source is configured for emitting intrinsic light and outputting the intrinsic light to the 1-to-N beam splitter; and the 1-to-N beam splitter is configured for splitting the intrinsic light to obtain intrinsic light beams and outputting the intrinsic light beams to the phase shifter array.

In an embodiment, the antenna array includes a plurality of antenna units, an output end of each of the antenna units is connected to the input end of the optical detection module, and optical paths from the antenna units to the optical detection module are of a same length.

In an embodiment, the optical detection module includes a mixer array and a plurality of balanced detectors; the mixer array includes a plurality of mixers, one input end of the mixer is connected to an output end of the phase shifter, another input end of the mixer is connected to the output end of the antenna unit, and an output end of the mixer is connected to an input end of the balanced detector;

the mixer is configured for mixing the intrinsic light beam and the sub-light spot to obtain first mixed light and second mixed light, and outputting the first mixed light and the second mixed light to the balanced detector; and the balanced detector is configured for converting the first mixed light and the second mixed light into a photocurrent.

In an embodiment, the optical detection module includes a mixer array and a plurality of photoelectric detectors; the mixer array includes a plurality of mixers, one input end of the mixer is connected to an output end of the phase shifter, another input end of the mixer is connected to the output end of the antenna unit, and an output end of the mixer is connected to an input end of the photoelectric detector;

the mixer is configured for mixing the intrinsic light beam and the sub-light spot to obtain third mixed light, and outputting the third mixed light to the photoelectric detector; and the photoelectric detector is configured for converting the third mixed light into a photocurrent.

In an embodiment, the mixer is a 90° mixer.

In an embodiment, the optical detection module includes a beam combiner array and a plurality of photoelectric detectors; the beam combiner array includes a plurality of beam combiners, one input end of the beam combiner is connected to an output end of the phase shifter, another input end of the beam combiner is connected to the output end of the antenna unit, and an output end of the beam combiner is connected to an input end of the photoelectric detector;

the beam combiner is configured for combining the intrinsic light beam and the sub-light spot to obtain combined light and outputting the combined light to the photoelectric detector; and the photoelectric detector is configured for converting the combined light into a photocurrent.

In an embodiment, the optical detection module is further configured for outputting the photocurrent to a processor, so that the processor obtains phase distortion and intensity distribution information of an incident wavefront according to the photocurrent.

In addition, to achieve the above objective, the present disclosure further provides an optical chip, including the on-chip wavefront sensor described above.

In addition, to achieve the above objective, the present disclosure further provides a communication device, including the optical chip described above.

In the present disclosure, an on-chip wavefront sensor is provided. The on-chip wavefront sensor includes: an antenna array, a reference light source module, a phase shifter array, and an optical detection module. The antenna array is configured for separating received spatial light to obtain a plurality of sub-light spots and outputting the sub-light spots to the optical detection module. The reference light source module is configured for generating a plurality of intrinsic light beams and outputting the intrinsic light beams to the phase shifter array. The phase shifter array is configured for performing phase shifting processing on the intrinsic light beams to obtain reference light and outputting the reference light to the optical detection module. The optical detection module is configured for performing coherent balanced detection according to the reference light and the sub-light spots to obtain a photocurrent corresponding to each of the sub-light spots. In the present disclosure, the antenna array is used as a coupler, so that after an incident wavefront enters the antenna array, coherent balanced detection is performed on a light spot received by each antenna and the intrinsic light that has been subjected to beam splitting, and the balanced detector can detect intensity and phase information of each light spot and convert the intensity and phase information of each light spot into a photocurrent signal. After the photocurrent signal is demodulated, the incident wavefront can be dynamically measured, thereby characterizing a wavefront distortion and intensity distribution. The present disclosure has high sensitivity, is suitable for optical chips, is small in size and easy to assemble, and can meet the requirements of miniaturization and high integration.

BRIEF DESCRIPTION OF DRAWINGS

In order to describe the technical schemes of the embodiments of the present disclosure or the existing technology clearly, the following briefly introduces the accompanying drawings required for describing the embodiments or the existing technology. Apparently, the accompanying drawings in the following description show only some embodiments of the present disclosure, and those having ordinary skills in the art may still derive other drawings from the structures shown in these accompanying drawings without creative efforts.

LIST OF REFERENCE NUMERALS

Figure 1:
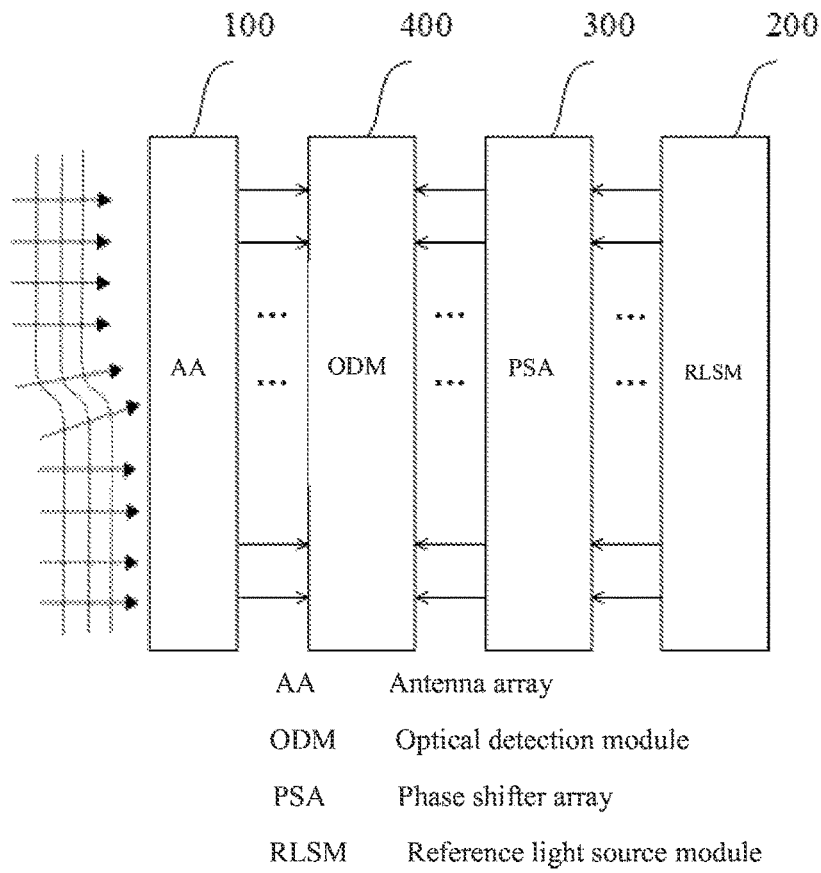
FIG. 1 is a first schematic structural diagram of a first embodiment of an on-chip wavefront sensor according to the present disclosure.

| Reference numeral | Name | Reference numeral | Name |
| --- | --- | --- | --- |
| 100 | Antenna array | 401 | Mixer array |
| 200 | Reference light source module | 402 | Balanced detector |
|  |  | 403 | Photoelectric detector |
| 300 | Phase shifter array | 404 | Beam combiner array |
| 400 | Optical detection module | MIX | Mixer |
|  |  | BC | Beam combiner |
| 101 | Antenna unit | BS | Sub-beam splitter |
| 202 | 1-to-N beam splitter |  |  |
| 201 | Intrinsic light source |  |  |
| PS | Phase shifter |  |  |

The objectives, functional features, and advantages of the present disclosure will be further described in conjunction with the accompanying drawings and embodiments.

DETAILED DESCRIPTION

It should be understood that the specific embodiments described herein are merely used for illustrating the present disclosure, and are not intended to limit the present disclosure.

An embodiment of the present disclosure provides an on-chip wavefront sensor. FIG. 1 is a first schematic structural diagram of a first embodiment of an on-chip wavefront sensor according to the present disclosure.

The on-chip wavefront sensor includes: an antenna array 100, a reference light source module 200, a phase shifter array 300, and an optical detection module 400. An output end of the antenna array 100 is connected to an input end of the optical detection module 400. An output end of the reference light source module 200 is connected to an input end of the phase shifter array 300. An output end of the phase shifter array 300 is connected to another input end of the optical detection module 400.

It is readily understood that the on-chip wavefront sensor is implemented on an optical chip (silicon-on-insulator, silicon nitride-on-insulator, indium phosphide-on-insulator, etc.) and may include more materials in practice, which are not limited in this embodiment.

The antenna array 100 is configured for separating received spatial light to obtain a plurality of sub-light spots and outputting the sub-light spots to the optical detection module 400.

It should be understood that the antenna array 100 includes a plurality of antenna units, i.e., a plurality of antennas. The antennas may each be used as a coupler to divide an incident wavefront into sub-light spots, couple the sub-light spots into a waveguide, and output the coupled sub-light spots to the optical detection module 400 through the waveguide.

The reference light source module 200 is configured for generating a plurality of intrinsic light beams and outputting the intrinsic light beams to the phase shifter array 300.

It should be understood that the reference light source module 200 includes an intrinsic light source, and is capable of providing intrinsic light, splitting the intrinsic light into a plurality of intrinsic light beams, and outputting the intrinsic light beams to the phase shifter array.

The phase shifter array 300 is configured for performing phase shifting processing on the intrinsic light beams to obtain reference light and outputting the reference light to the optical detection module 400.

It should be understood that the phase shifter array 300 includes a plurality of phase shifters. The phase shifter can perform phase-shifting processing the intrinsic light beams to obtain phase-shifted intrinsic light beams, i.e., the reference light.

The optical detection module 400 is configured for performing coherent balanced detection according to the reference light and the sub-light spots to obtain a photocurrent corresponding to each of the sub-light spots.

It should be understood that the optical detection module 400 may include a plurality of mixers and corresponding balanced detectors, or a plurality of mixers and corresponding photoelectric detectors, or a plurality of beam combiners and corresponding photoelectric detectors, to perform coherent balanced detection on the sub-light spots and the reference light and convert the reference light and the sub-light spots into photocurrents. Because the reference light is identical, the intensity of the photocurrent corresponds to the intensity of a light field of the sub-light spot.

The optical detection module 400 is further configured for outputting the photocurrent to a processor, so that the processor obtains phase distortion and intensity distribution information of an incident wavefront according to the photocurrent.

It should be noted that the processor may be a processor of an upper computer, and the upper computer obtains intensity and phase information of each sub-light spot based on the photocurrent outputted by each detector, and demodulates the photocurrents to dynamically measure the incident wavefront, so as to characterize a wavefront distortion and intensity distribution.

Figure 2A:
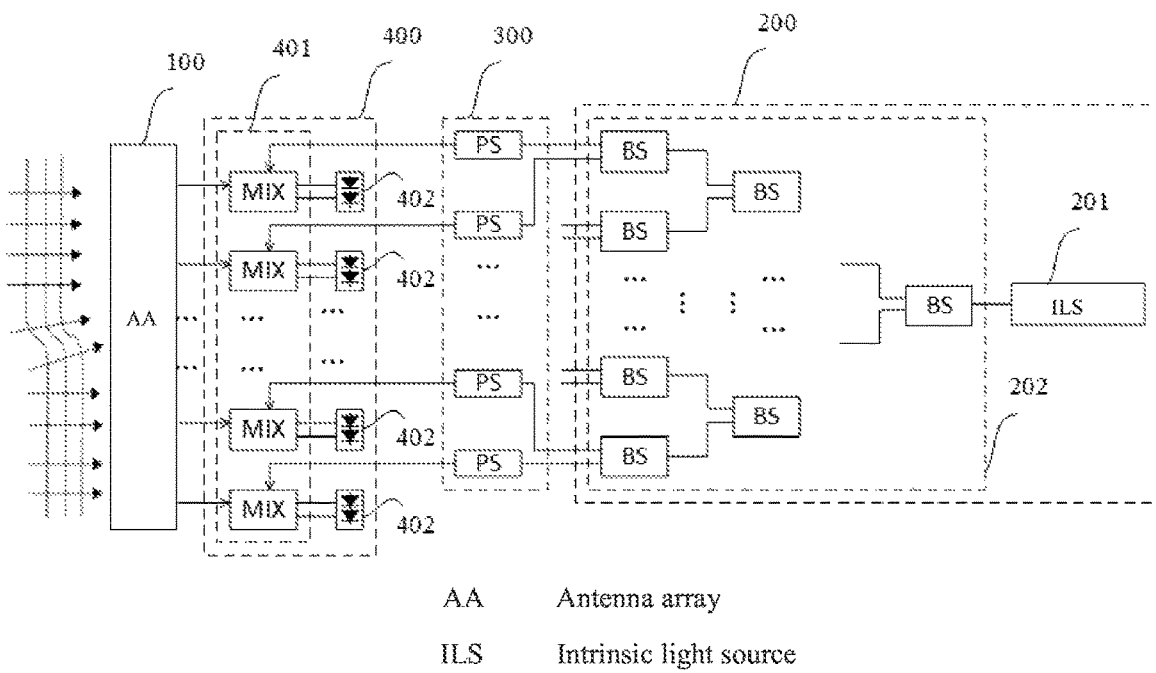
FIG. 2A is a second schematic structural diagram of the first embodiment of the on-chip wavefront sensor according to the present disclosure.

In an embodiment, reference is made to FIG. 2A. FIG. 2A is a second schematic structural diagram of the first embodiment of the on-chip wavefront sensor according to the present disclosure. The reference light source module 200 includes a 1-to-N beam splitter 202 and an intrinsic light source 201. An output end of the intrinsic light source 201 is connected to an input end of the 1-to-N beam splitter 202. An output end of the 1-to-N beam splitter 202 is connected to the input end of the phase shifter array 300. The 1-to-N beam splitter 202 is formed by a plurality of cascaded sub-beam splitters BS. The phase shifter array 300 includes a plurality of phase shifters PS. The output end of the 1-to-N beam splitter 202 is connected to an input end of each of the phase shifters PS.

The intrinsic light source 201 is configured for emitting intrinsic light and outputting the intrinsic light to the 1-to-N beam splitter 202. The intrinsic light source 201 may be directly integrated or hybridly integrated.

The 1-to-N beam splitter 202 is configured for splitting the intrinsic light to obtain intrinsic light beams and outputting the intrinsic light beams to the phase shifter array 300.

The sub-beam splitters BS in the 1-to-N beam splitter 202 may be 1*2 beam splitters, and the 1*2 beam splitters may use Y-branch beam splitters, multimode interference (MMI) beam splitters or other beam splitters.

The antenna array 100 includes a plurality of antenna units 101. An output end of each of the antenna units 101 is connected to the input end of the optical detection module 400. Optical paths from the antenna units 101 to the optical detection module 400 are of a same length.

It should be noted that a larger number and a higher density of antenna units 101 in the antenna array 100 indicates higher precision.

Figure 4:
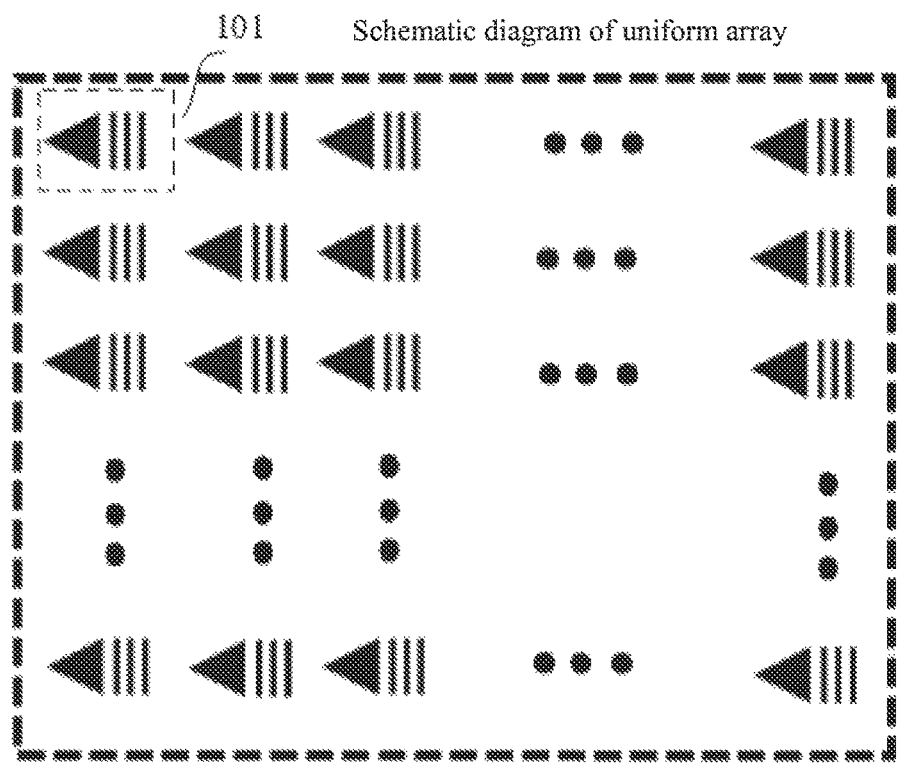
FIG. 4 is a schematic diagram of an antenna array, which is a uniform array, in the on-chip wavefront sensor according to the present disclosure.
Figure 5:
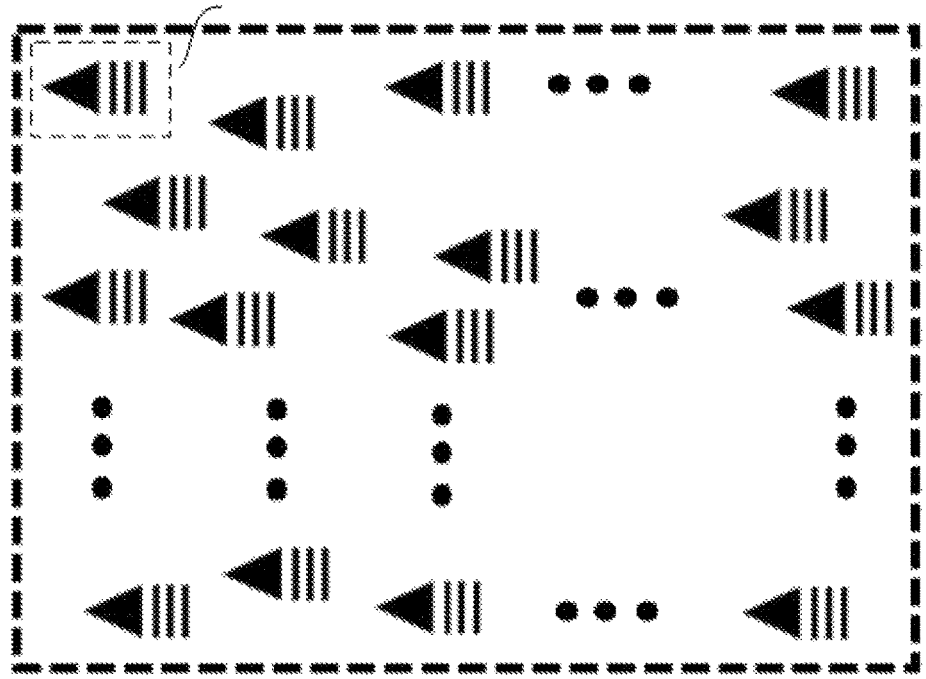
FIG. 5 is a schematic diagram of an antenna array, which is a sparse array, in the on-chip wavefront sensor according to the present disclosure.

In an embodiment, reference is made to FIG. 4 and FIG. 5. FIG. 4 is a schematic diagram of an antenna array 100, which is a uniform array, in the on-chip wavefront sensor according to the present disclosure, and FIG. 5 is a schematic diagram of an antenna array 100, which is a sparse array, in the on-chip wavefront sensor according to the present disclosure.

It should be understood that the antenna array 100 may be a uniform array or a sparse array. The uniform array includes densely arranged antenna units and has high detection resolution. The sparse array has low detection resolution, is insensitive to angles, and therefore is suitable for scenarios having low requirements on angle sensitivity.

The optical detection module 400 includes a mixer array 401 and a plurality of balanced detectors 402. The mixer array 401 includes a plurality of mixers MIX. One input end of the mixer MIX is connected to an output end of the phase shifter PS. Another input end of the mixer MIX is connected to the output end of the antenna unit 101. An output end of the mixer MIX is connected to an input end of the balanced detector 402.

It should be noted that the intrinsic light passes through the 1-to-N beam splitter 202 to obtain intrinsic light beams, and the intrinsic light beams are of equal phases when reaching the mixers MIX through the waveguide. Optical paths from the antenna units 101 in the antenna array 100 to the mixers MIX are of a same length.

It is readily understood that the number of mixers MIX is the same as the number of balanced detectors 402, the number of antenna units 101 is the same as the number of mixers MIX, and the number of phase shifters PS is the same as the number of the mixers MIX.

Figure 3:
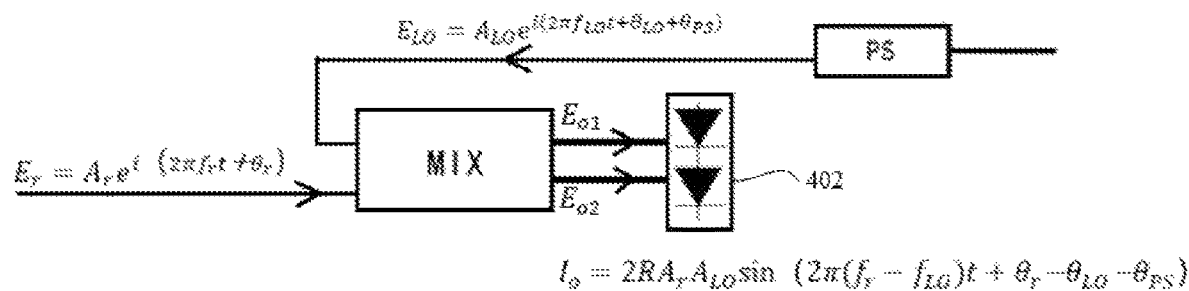
FIG. 3 is a diagram showing the principle of coherent detection performed by the on-chip wavefront sensor according to the present disclosure.

In an embodiment, reference is made to FIG. 3. FIG. 3 is a diagram showing the principle of coherent detection performed by the on-chip wavefront sensor according to the present disclosure.

The mixer MIX is configured for mixing an intrinsic light beam $E_{LO}$ and a sub-light spot $E_r$ to obtain first mixed light $E_{01}$ and second mixed light $E_{02}$, and outputting the first mixed light $E_{01}$ and the second mixed light $E_{02}$ to the balanced detector 402.

It should be noted that the mixer MIX in this embodiment is a 90° mixer. The intrinsic light beam $E_{LO}$ and the sub-light spot $E_r$ at an input port of the 90° mixer may be expressed as:

$$E_{LO}=A_{LO}e^{i(2\pi f_{LO}t+\theta_{LO}+\theta_{PS})}$$

$$E_r=A_r e^{i(2\pi f_r t+\theta_r)}.$$

After the mixing by the mixer, a light intensity of the first mixed light $E_{01}$ and the second mixed light $E_{02}$ can be calculated according to a transmission matrix, and expressed as:

$$\begin{pmatrix} E_{o1} \\ E_{o2} \end{pmatrix} = \frac{\sqrt{2}}{2}\begin{pmatrix} 1 & i \\ i & 1 \end{pmatrix}\begin{pmatrix} A_{LO}e^{i(2\pi f_{LO}t+\theta_{LO}+\theta_{PS})} \\ A_r e^{i(2\pi f_r t+\theta_r)} \end{pmatrix}.$$

The balanced detector 402 is configured for converting the first mixed light $E_{01}$ and the second mixed light $E_{02}$ into a photocurrent.

The photocurrent $I_o$ outputted by the balanced detector 402 is:

$$I_o = \tfrac{1}{2}R(A_r^2+A_{LO}^2+2A_r A_{LO}\sin(\theta_r-\theta_{LO}-\theta_{PS}))$$

$$I_o = R(|E_{o2}|^2-|E_{o1}|^2)=2RA_r A_{LO}\sin(2\pi(f_r-f_{LO})t+\theta_r-\theta_{LO}-\theta_{PS}).$$

Because the intrinsic light beam $E_{LO}$ and the sub-light spot $E_r$ are of a same frequency, the photocurrent $I_o$ is expressed as:

$$I_o = 2RA_r A_{LO}\sin(\theta_r-\theta_{LO}-\theta_{PS}).$$

In an embodiment, after the upper computer obtains the photocurrent, phase shifts of the phase shifters PS are adjusted to make $\theta_r-\theta_{LO}-\theta_{PS}=\pi/2$, and the following equation is obtained:

$$I_{o\_max}=2RA_r A_{LO}.$$

The intensity distribution of the wavefront can be solved by extracting the maximum current $I_{o\_max}$ of each balanced detector 402. A phase condition under which each balanced detector reaches the maximum current is extracted: $\theta_r-\theta_{LO}-\theta_{PS}=\pi/2$. The intrinsic light beams reaching the mixers MIX through the waveguide are of a same phase $\theta_{LO}$. The phase shifts $\theta_{PS}$ of the phase shifters PS can be measured. Therefore, a phase difference between phases $\theta_r$ of sub-light spots can be obtained.

In an embodiment, optical paths from the antennas in the antenna array 100 to the mixers MIX are of a same length. Therefore, the phase difference between phases $\theta_r$ can be characterized as a phase difference between wavefront sub-apertures, such that the phase distribution of the wavefront can be obtained. The wavefront can be reconstructed by measuring the obtained intensity distribution and phase distribution.

Figure 2B:
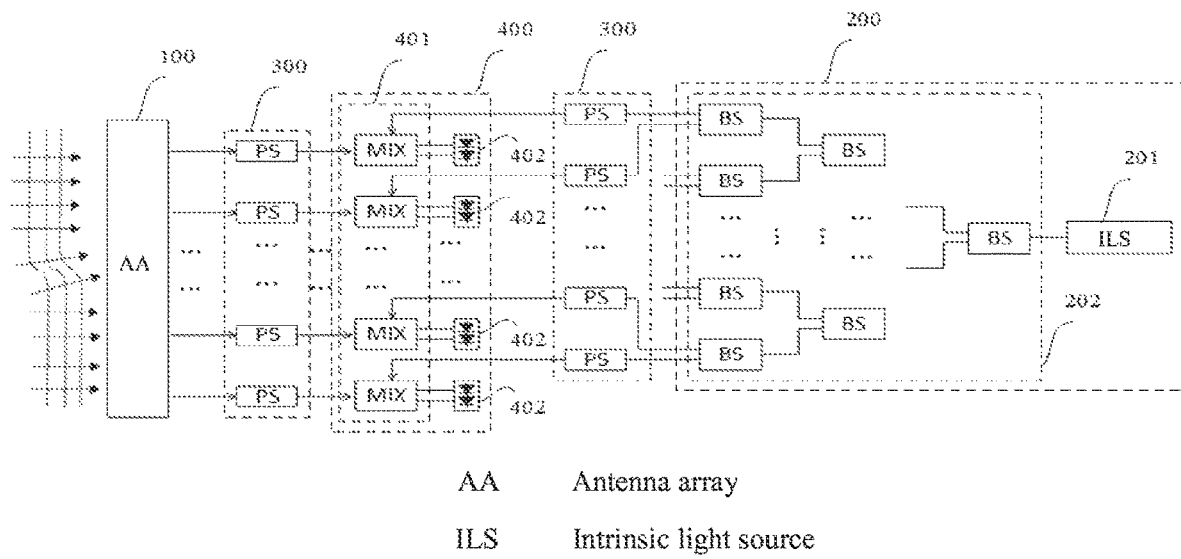
FIG. 2B is a third schematic structural diagram of the first embodiment of the on-chip wavefront sensor according to the present disclosure.

In an embodiment, reference is made to FIG. 2B. FIG. 2B is a third schematic structural diagram of the first embodiment of the on-chip wavefront sensor according to the present disclosure. In an implementation, another phase shifter array 300 may be arranged between the output end of the antenna array 100 and the input end of the optical detection module 400. The antenna array 100 is used as a coupler to divide the incident wavefront into sub-light spots and couple the sub-light spots into the waveguide. The waveguide inputs the sub-light spots into the phase shifter array 300 for uniform phase-shifting processing, so as to facilitate the optical detection performed by the optical detection module 400.

Figure 2C:
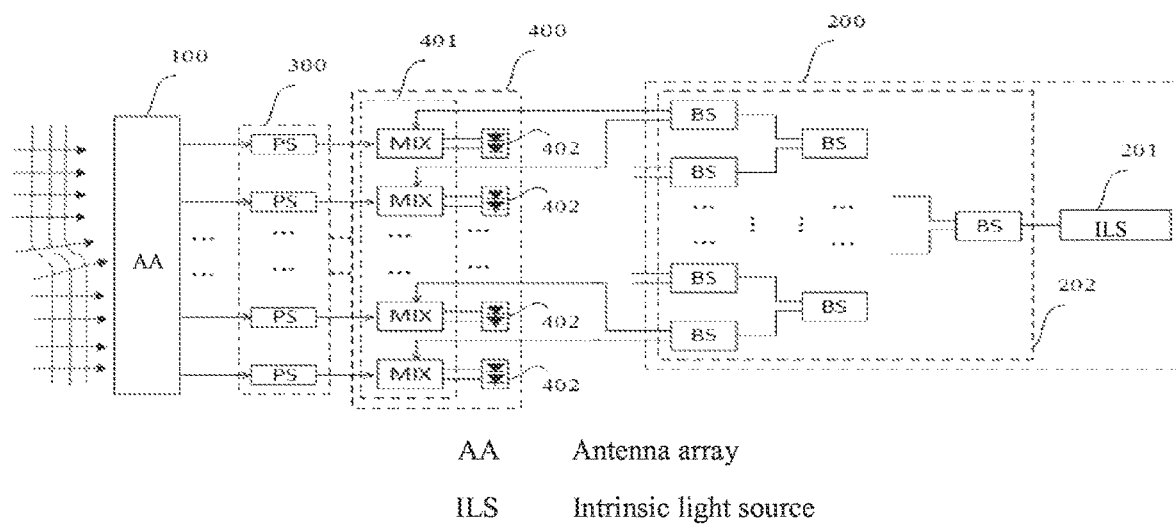
FIG. 2C is a fourth schematic structural diagram of the first embodiment of the on-chip wavefront sensor according to the present disclosure.

In an embodiment, reference is made to FIG. 2C. FIG. 2C is a fourth schematic structural diagram of the first embodiment of the on-chip wavefront sensor according to the present disclosure. In an implementation, only one phase shifter array 300 is arranged between the output end of the antenna array 100 and the input end of the optical detection module 400.

In this embodiment, the antenna array is used as a coupler, so that after an incident wavefront enters the antenna array, coherent balanced detection is performed on a light spot received by each antenna and the intrinsic light that has been subjected to beam splitting, and the balanced detector can detect intensity and phase information of each light spot and convert the intensity and phase information of each light spot into a photocurrent signal. After the photocurrent signal is demodulated, the incident wavefront can be dynamically measured, thereby characterizing a wavefront distortion. The present disclosure has high sensitivity, is suitable for optical chips, is small in size and easy to assemble, and can meet the requirements of miniaturization and high integration.

Figure 6:
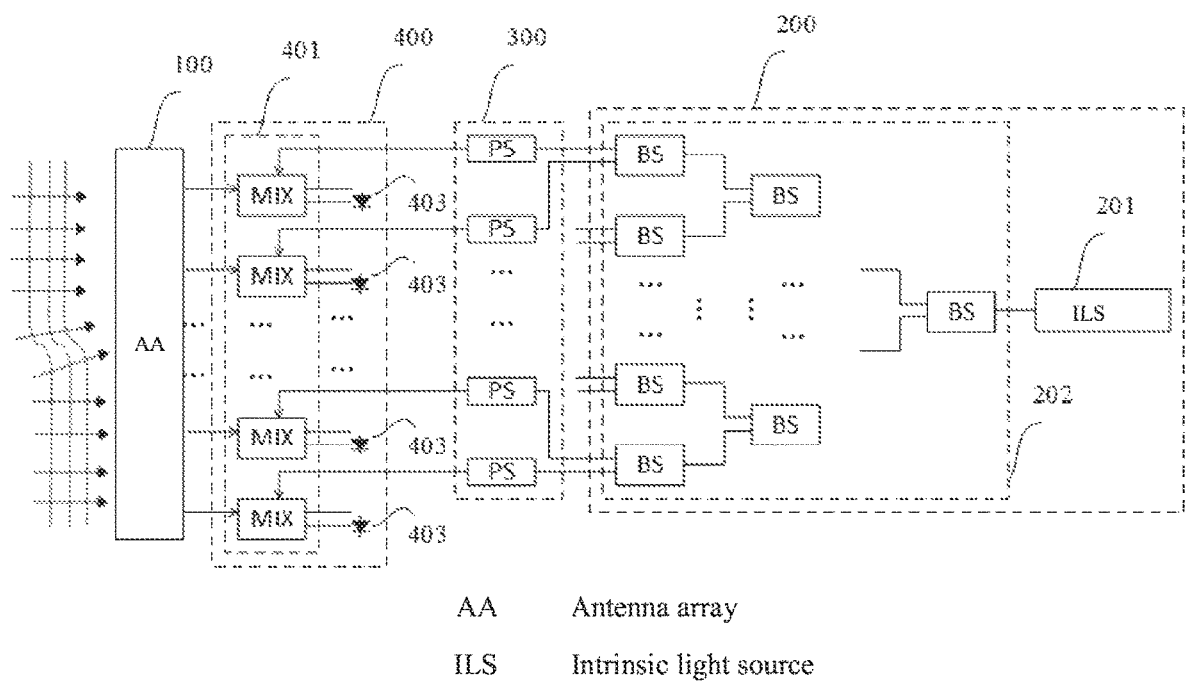
FIG. 6 is a schematic structural diagram of a second embodiment of an on-chip wavefront sensor according to the present disclosure.

Based on the first embodiment of the on-chip wavefront sensor of the present disclosure, a second embodiment of the on-chip wavefront sensor of the present disclosure is proposed. Referring to FIG. 6, FIG. 6 is a schematic structural diagram of the second embodiment of an on-chip wavefront sensor according to the present disclosure.

The optical detection module 400 includes a mixer array 401 and a plurality of photoelectric detectors 403. The mixer array 401 includes a plurality of mixers MIX. One input end of the mixer MIX is connected to an output end of the phase shifter PS. Another input end of the mixer MIX is connected to the output end of the antenna unit 101. An output end of the mixer MIX is connected to an input end of the photoelectric detector 403.

The mixer MIX is configured for mixing the intrinsic light beams and the sub-light spots to obtain third mixed light, and outputting the third mixed light to the photoelectric detector 403.

The photoelectric detector 403 is configured for converting the third mixed light into a photocurrent.

It should be noted that the mixer MIX includes two output ends, and the input end of the photoelectric detector 403 may be connected to either of the output ends of the mixer MIX.

Based on the structure of this embodiment, an output current $I_o$ of the photoelectric detector can be obtained through calculation and derivation as:

$$I_o = \tfrac{1}{2}R(A_r^2+A_{LO}^2+2A_r A_{LO}\sin(\theta_r-\theta_{LO}-\theta_{PS})).$$

The upper computer adjusts the phase shifters to make:

$$\theta_r-\theta_{LO}-\theta_{PS}=\pi/2.$$

The following equation is obtained:

$$I_{o\_max}=\tfrac{1}{2}R(A_r^2+A_{LO}^2+2A_r A_{LO}).$$

The intensity distribution and the phase distribution of the wavefront can also be solved by extracting the maximum current $I_{o\_max}$ of each photoelectric detector 403 and the phase condition under which the maximum current is reached.

In this embodiment, the antenna array is used as a coupler, so that after an incident wavefront enters the antenna array, photoelectric detection is performed on a light spot received by each antenna and the intrinsic light that has been subjected to beam splitting, and the photoelectric detector can detect intensity and phase information of each light spot and convert the intensity and phase information of each light spot into a photocurrent signal. After the photocurrent signal is demodulated, the incident wavefront can be dynamically measured, thereby characterizing a wavefront distortion. The present disclosure has high sensitivity, is suitable for optical chips, is small in size and easy to assemble, and can meet the requirements of miniaturization and high integration.

Figure 7:
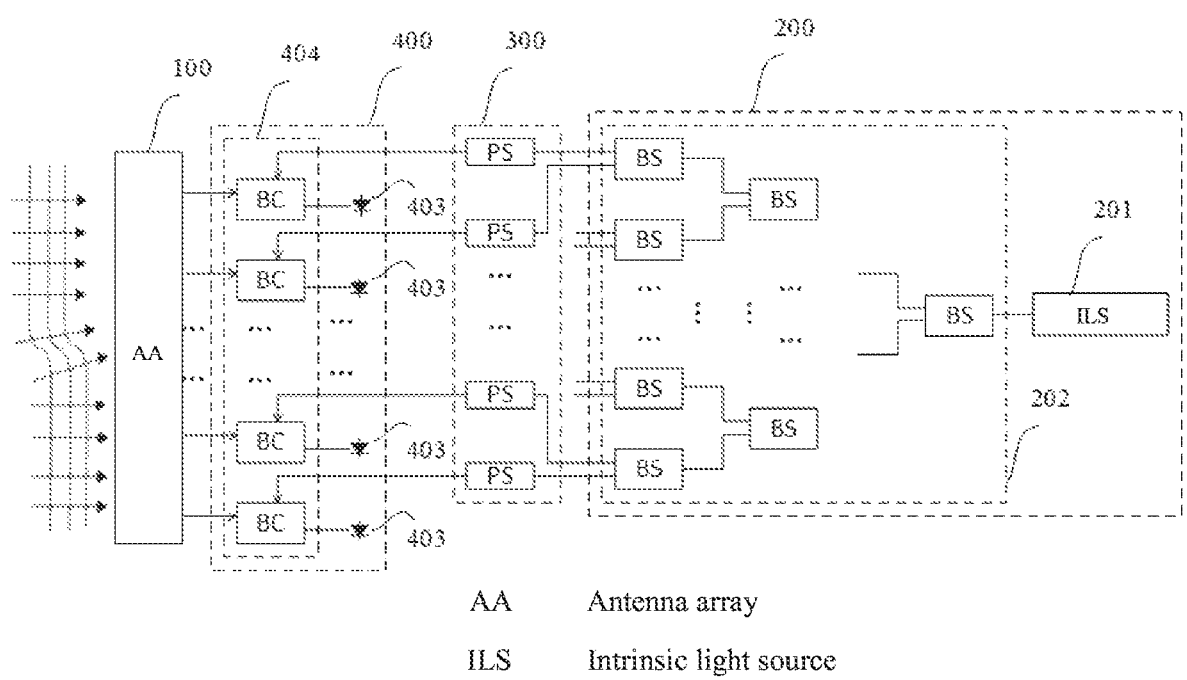
FIG. 7 is a schematic structural diagram of a third embodiment of an on-chip wavefront sensor according to the present disclosure.

Based on the second embodiment of the on-chip wavefront sensor of the present disclosure, a third embodiment of the on-chip wavefront sensor of the present disclosure is proposed. Referring to FIG. 7, FIG. 7 is a schematic structural diagram of the third embodiment of an on-chip wavefront sensor according to the present disclosure.

The optical detection module 400 includes a beam combiner array 404 and a plurality of photoelectric detectors 403. The beam combiner array 404 includes a plurality of beam combiners BC. One input end of the beam combiner BC is connected to an output end of the phase shifter PS. Another input end of the beam combiner BC is connected to the output end of the antenna unit 101. An output end of the beam combiner BC is connected to an input end of the photoelectric detector 403.

The beam combiner BC is configured for combining the intrinsic light beam and the sub-light spot to obtain combined light and outputting the combined light to the photoelectric detector 403.

The photoelectric detector 403 is configured for converting the combined light into a photocurrent.

In this embodiment, the mixers are replaced by beam combiners BC. The beam combiners each have one output port. The input end of the photoelectric detector 403 is connected to the output port.

In an embodiment, an output current $I_o$ of the photoelectric detector 403 can be obtained through calculation and derivation as:

$$I_o = \tfrac{1}{2}R(A_r^2 + A_{LO}^2 + 2A_rA_{LO}\cos(\theta_r - \theta_{LO} - \theta_{PS})).$$

The phase shifters are adjusted to make $\theta_r - \theta_{LO} - \theta_{PS} = 0$, and the following equation is obtained:

$$I_{o\_max} = \tfrac{1}{2}R(A_r^2 + A_{LO}^2 + 2A_rA_{LO}).$$

The intensity distribution and the phase distribution of the wavefront can also be solved by extracting the maximum current $I_{o\_max}$ of each photoelectric detector 403 and the phase condition under which the maximum current is reached.

It should be noted that the structure of the scheme using photoelectric detectors is simpler than that of the scheme using mixers, and is thus suitable for scenarios having low requirements on detection sensitivity.

In this embodiment, the antenna array is used as a coupler, so that after an incident wavefront enters the antenna array, photoelectric detection is performed on a light spot received by each antenna and the intrinsic light that has been subjected to beam splitting, and the photoelectric detector can detect intensity and phase information of each light spot and convert the intensity and phase information of each light spot into a photocurrent signal. After the photocurrent signal is demodulated, the incident wavefront can be dynamically measured, thereby characterizing a wavefront distortion. The present disclosure has high sensitivity, is suitable for optical chips, is small in size and easy to assemble, and can meet the requirements of miniaturization and high integration.

In addition, to achieve the above objective, the present disclosure further provides an optical chip, including the on-chip wavefront sensor described above.

Because the optical chip adopts all the technical schemes of the above embodiments, the optical chip has at least all the beneficial effects achieved by the technical schemes of the above embodiments, and the details will not be repeated here.

In addition, to achieve the above objective, the present disclosure further provides a communication device, including the optical chip described above.

Because the communication device adopts all the technical schemes of the above embodiments, the optical chip has at least all the beneficial effects achieved by the technical schemes of the above embodiments, and the details will not be repeated here.

It should be understood that the above description is for illustration only, and does not constitute any limitation to the technical schemes of the present disclosure. In specific applications, those having ordinary skills in the art can make arrangements as needed, which is not limited in the present disclosure.

It should be noted that the processes described above are merely illustrative and are not intended to limit the scope of protection of the present disclosure. In practical applications, those having ordinary skills in the art can select some or all of the processes according to actual needs to achieve the objectives of the embodiments, which is not limited herein.

In addition, for technical details that are not described in detail in this embodiment, reference can be made to the on-chip wavefront sensor provided in any embodiment of the present disclosure, and the details will not be repeated herein.

Moreover, it should be noted that in the present disclosure, the terms "comprise", "include" or any other variants thereof are intended to encompass non-exclusive inclusion, such that a process, a method, an article or a system including a series of elements not only include those elements, but also includes other elements not listed explicitly or includes intrinsic elements for the process, the method, the article, or the system. Without any further limitation, an element defined by the phrase "comprising one" does not exclude the existence of other same elements in the process, the method, the article, or the system that includes the elements.

The serial numbers of the embodiments of the present disclosure are only for the purpose of description, and do not represent the preference for the embodiments.

From the above detailed description of the embodiments, those having ordinary skills in the art can clearly understand that the methods in the above embodiments can be implemented by software and a necessary general-purpose hardware platform, and of course can also be implemented by hardware, but in many cases, the former is a better implementation. Based on such an understanding, the technical schemes of the present disclosure essentially or the part contributing to conventional technologies may be embodied in the form of a software product. The computer software product is stored in a storage medium (such as a Read-Only Memory (ROM), a Random Access Memory (RAM), a magnetic disk, an optical disc, etc.), and includes several instructions for instructing a terminal device (which may be a computer, a server, a network device, or the like) to execute the methods described in the embodiments of the present disclosure.

The above are only preferred embodiments of the present disclosure, and therefore are not intended to limit the protection scope of the present disclosure. Any equivalent structure or equivalent process transformation made based on the contents of the description and drawings of the present disclosure, or the direct or indirect application of the present disclosure to other related technical fields are all included in the protection scope of the present disclosure.

What is claimed is:

1. An on-chip wavefront sensor, comprising: an antenna array, a reference light source module, a phase shifter array, and an optical detection module, wherein an output end of the antenna array is connected to an input end of the optical detection module, an output end of the reference light source module is connected to an input end of the phase shifter array, and an output end of the phase shifter array is connected to another input end of the optical detection module;

the antenna array comprises a plurality of antenna units, wherein the antenna units are respectively configured for separating received spatial light to obtain a plurality of sub-light spots and outputting the sub-light spots to the optical detection module;

the reference light source module is configured for generating a plurality of intrinsic light beams and outputting the intrinsic light beams to the phase shifter array;

the phase shifter array comprises a plurality of phase shifters, wherein the phase shifters are respectively configured for performing phase shifting processing on the intrinsic light beams to obtain reference light and outputting the reference light to the optical detection module;

the optical detection module is configured for performing coherent balanced detection according to the reference light and the sub-light spots to obtain a photocurrent corresponding to each of the sub-light spots;

the optical detection module comprises a beam combiner array and a plurality of photoelectric detectors; the beam combiner array comprises a plurality of beam combiners, one input end of each of the plurality of beam combiners is connected to an output end of a respective one of the plurality of phase shifters, another input end of each of the plurality of beam combiners is connected to an output end of a respective one of the plurality of antenna units, and an output end of each of the plurality of beam combiners is connected to an input end of a respective one of the plurality of photoelectric detectors;

each of the plurality of beam combiners is configured for combining the reference light and a respective one of the plurality of sub-light spots to obtain combined light and outputting the combined light to a respective one of the plurality of photoelectric detectors;

each of the plurality of photoelectric detectors is configured for converting the combined light into a photocurrent;

the optical detection module is further configured for outputting the photocurrent to a processor, so that the processor obtains phase distortion and intensity distribution information of an incident wavefront according to the photocurrent.

2. The on-chip wavefront sensor of claim 1, wherein the reference light source module comprises a 1-to-N beam splitter and an intrinsic light source, an output end of the intrinsic light source is connected to an input end of the 1-to-N beam splitter, and an output end of the 1-to-N beam splitter is connected to the input end of the phase shifter array; the 1-to-N beam splitter is formed by a plurality of cascaded sub-beam splitters;

the intrinsic light source is configured for emitting intrinsic light and outputting the intrinsic light to the 1-to-N beam splitter; and the 1-to-N beam splitter is configured for splitting the intrinsic light to obtain intrinsic light beams and outputting the intrinsic light beams to the phase shifter array.

3. The on-chip wavefront sensor of claim 2, wherein the output end of each of the plurality of antenna units is connected to the input end of the optical detection module, and optical paths from the antenna units to the optical detection module are of a same length.

4. An optical chip, comprising the on-chip wavefront sensor of claim 1.

5. A communication device, comprising the optical chip of claim 4.

* * * * *